United States Patent
Takahashi et al.

[11] Patent Number: 5,946,423
[45] Date of Patent: Aug. 31, 1999

[54] APPARATUS AND METHOD FOR PROCESSING IMAGES USING POSITION-DEPENDENT WEIGHTING FACTORS

[75] Inventors: Hiroyuki Takahashi, Kawasaki; Mitsuru Kurita, Tokyo, both of Japan

[73] Assignee: Canon Kabushiki Kaisha, Tokyo, Japan

[21] Appl. No.: 08/250,345

[22] Filed: May 27, 1994

Related U.S. Application Data

[63] Continuation of application No. 07/864,009, Apr. 7, 1992, abandoned.

[30] Foreign Application Priority Data

Apr. 19, 1991 [JP] Japan .................................. 3-103167

[51] Int. Cl.$^6$ ......................................... G06K 9/36
[52] U.S. Cl. ................................. 382/284; 358/584
[58] Field of Search ............................. 382/57, 41, 284, 382/282, 162, 167, 294; 388/584, 586, 599, 588; 358/450

[56] References Cited

U.S. PATENT DOCUMENTS

| | | | |
|---|---|---|---|
| 4,616,262 | 10/1986 | Toriumi et al. ......................... | 358/183 |
| 4,872,056 | 10/1989 | Hicks et al. ............................ | 358/183 |
| 4,908,700 | 3/1990 | Ishii perdox et al. .................... | 258/22 |
| 4,996,598 | 2/1991 | Haug ..................................... | 358/183 |
| 5,130,801 | 7/1992 | Yamaguchi ............................. | 358/183 |
| 5,146,336 | 9/1992 | Tessia et al. ............................ | 358/183 |
| 5,155,595 | 10/1992 | Robison ................................. | 358/183 |
| 5,157,494 | 10/1992 | Chaplin ................................. | 358/183 |

*Primary Examiner*—Joseph Mancuso
*Attorney, Agent, or Firm*—Fitzpatrick, Cella, Harper & Scinto

[57] ABSTRACT

An image processing apparatus which is capable of combining two images desirably by providing weight and performing an image editing operation. The image processing apparatus has an addition/output device for adding the weighting factors of a first and a second image data and outputting it; a counter device for counting the image data in the direction of the main scanning or sub-scanning or in both of the directions; and an addition control means for changing the weighting factors in the weighting operation performed in the addition/output device on the basis of the count value of the counter means. As a result, weighting factors can be changed within one combined image. Thus, desired image editing operations can be performed.

25 Claims, 11 Drawing Sheets

|  | 1CLK | 2CLK | 3CLK | 4CLK |
|---|---|---|---|---|
| 1 LINE | (a) | | (b) FIRST IMAGE WRITING CYCLE | |
| 2 LINE | (c) | | (d) | |
| 3 LINE | (e) | | (f) | |
| 4 LINE | (g) | | (h) | |

FIG. 7

|  | 1CLK | 2CLK | 3CLK | 4CLK |
|---|---|---|---|---|
| 1 LINE | (a) FIRST IMAGE READING CYCLE | | (b) COMPOSITE IMAGE WRITING CYCLE | |
| 2 LINE | (c) | | (d) | |
| 3 LINE | (e) CYAN READING CYCLE | | (f) MAGENTA READING CYCLE | |
| 4 LINE | (g) YELLOW READING CYCLE | | (h) BLACK READING CYCLE | |

CHANGING DIRECTION OF WEIGHTING

PORTION IN WHICH WEIGHTING IS CHANGED

APPARATUS AND METHOD FOR PROCESSING IMAGES USING POSITION-DEPENDENT WEIGHTING FACTORS

This application is a continuation of application Ser. No. 07/864,009 filed Apr. 7, 1992, now abandoned.

BACKGROUND OF THE INVENTION

1. Field of the Invention

The present invention relates to an apparatus and method for processing images digitally and outputting them after various image processing operations are performed thereon.

2. Related Background Art

Hitherto, this type of apparatus has had a function for computing weights regarding two images and combining half-tone images, or a half-tone image and a character image.

This image recording apparatus combines images on the basis of weighting factors as a result of an operator setting weighting factors which determine the ratio at which two images are combined. For example, after first image data is input and stored in a memory, the first image data is read out from the memory in synchronization with the operation for inputting second image data, which is input next. Thus, the two image data are added according to the above weighting factors and a combined image is formed.

However, in the above-described prior art, although weighting factors in one-time image combination processing can be properly selected, one weighting factor must be selected for one combined image, and therefore an image combination can be performed at a uniform ratio only within one image. Therefore, it is difficult to obtain a wide variety of images.

SUMMARY OF THE INVENTION

The present invention has been accomplished to solve the above-mentioned problems of the prior art.

An object of the present invention is to provide an apparatus and method for processing images, which is capable of obtaining a wide variety of images.

Another object of the present invention is to provide an apparatus and method for processing images, which is capable of combining two images, which combined image has gradation.

To this end, according to the preferred embodiments of the present invention, there is provided an image processing apparatus comprising: addition output means for adding the weighting factors of the first image data and the second image data and outputting them; counter means for counting the image data in a main scanning direction or in a subscanning direction, or in both of the directions; and addition control means for changing the weighting factors of the weighting addition by the addition output means on the basis of the count value of the counter means. Therefore, desired image editing can be easily performed by changing the weighting factors within one combined image.

A further object of the present invention is to provide an apparatus and method for processing images, which is capable of reading a manuscript, compressing the manuscript data and then editing the manuscript data stored in an image memory.

A still further object of the present invention is to provide a color copier having novel functions.

The aforementioned and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

Figure 1:
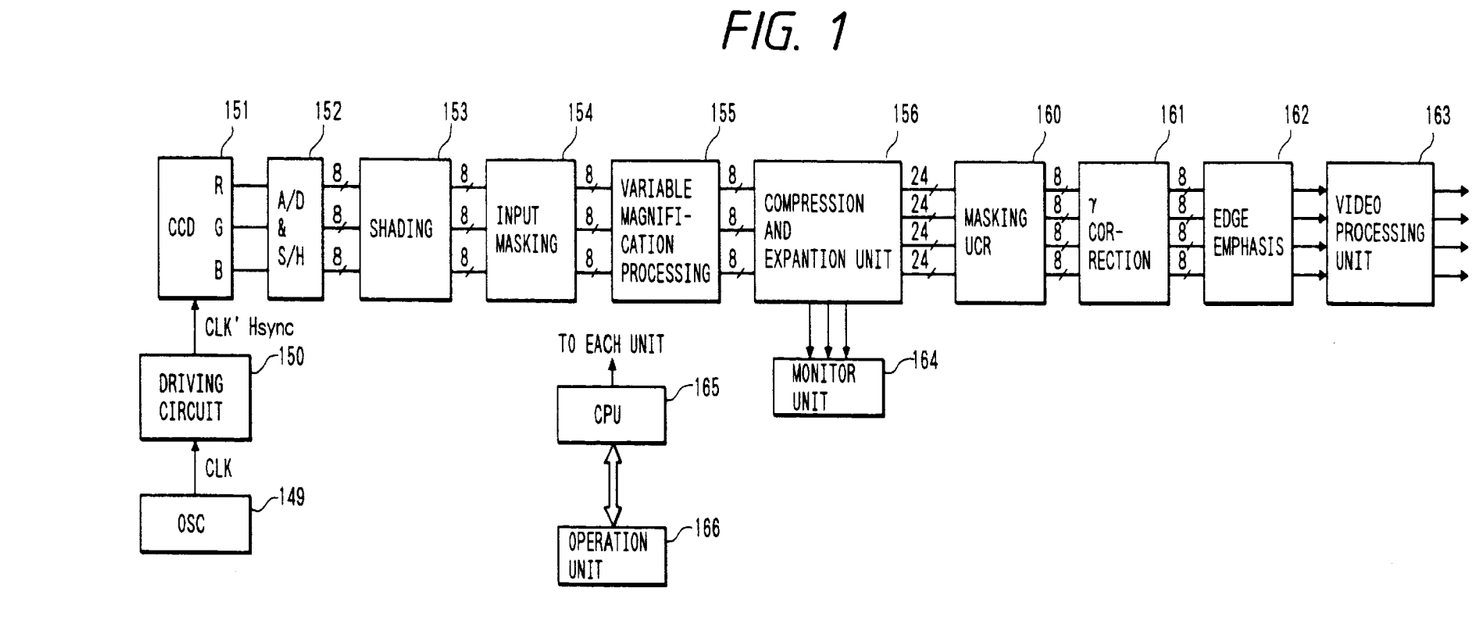
FIG. 1 is a block diagram which illustrates a first embodiment of the present invention.

FIG. 1 is a block diagram which illustrates the construction of an image processing circuit of a color image recording apparatus according to an embodiment of the present invention.

First, a reader section for reading a manuscript will be explained. An image on a manuscript is read by a CCD 151, which has filters for three colors of RGB disposed therein, and which is a line sensor capable of reading a width the same as that of a manuscript. The image is converted into digital data by an A/D (analog to digital) conversion and S/H (sample hold) section 152. The digital data is corrected by a shading correction section 153 and an input masking section 154, and a variable magnification is performed thereon by a variable magnification unit 155 if required. Next, this image data is stored in a compression/expansion unit 156, and a masking operation is performed thereon by a masking/UCR unit 160. Furthermore, output image data of YMCK is formed by a γ unit 161 and an edge highlighting unit 162 and supplied to a printer unit through a video processing unit 163. That is, the video processing unit 163 processes Y, M, C and K video signals sent from the reader unit and generates pulse-width-modulated (PWM) light beam signals. Reference numeral 150 denotes a driving circuit for driving the CCD 151. This driving circuit 150 frequency-divides a clock supplied from an oscillator 149 and outputs a clock CLK' for driving the CCD 151 and HSYNC indicating a timing at which one line of image data is read from the CCD 151. Reference numeral 165 denotes a CPU which controls each of the units of the apparatus; reference numeral 166 denotes an operation unit by which instructions for starting reading of an image, determining whether images should be combined, or determining how images should be combined are given by a user.

Figure 2:
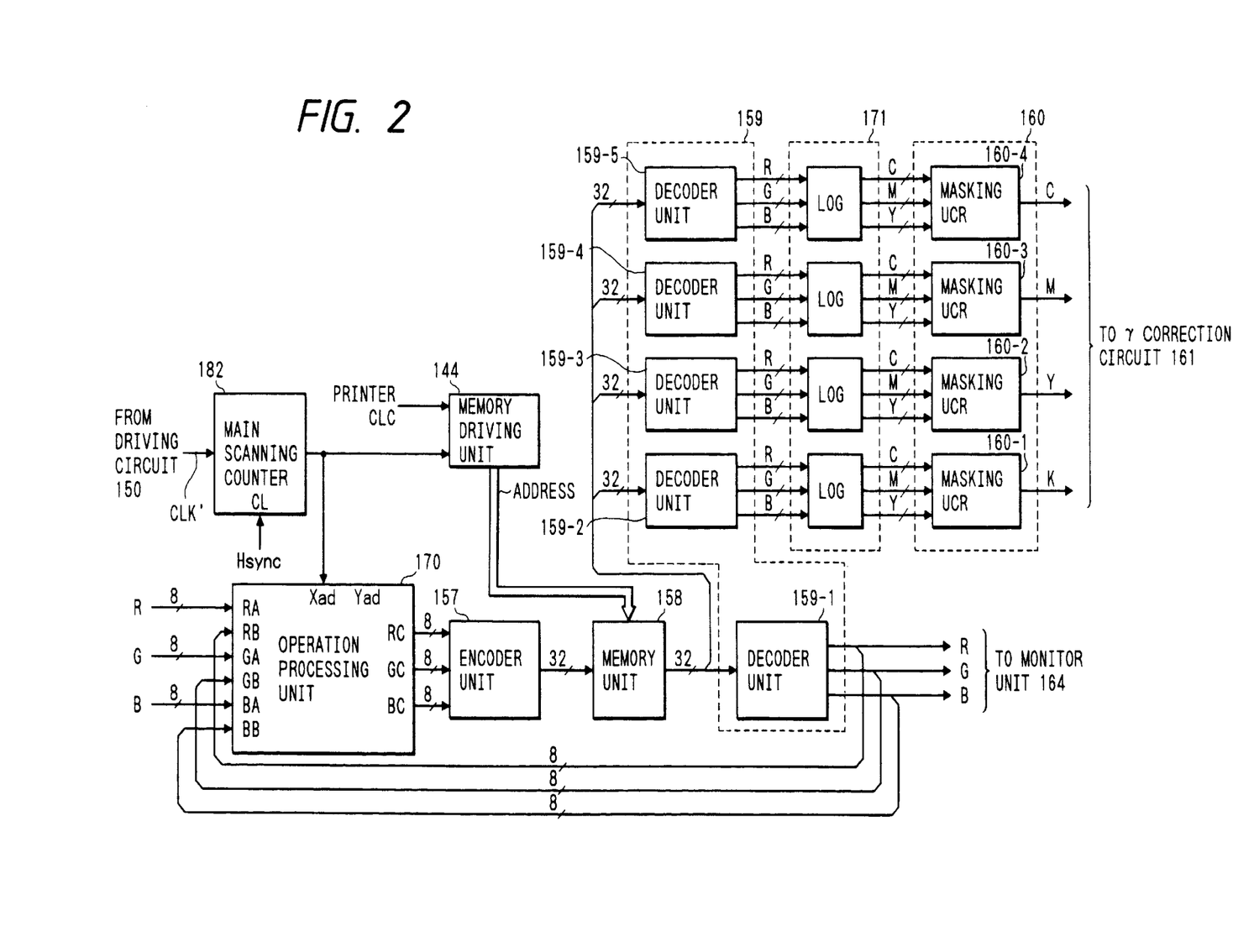
FIG. 2 is a block diagram which illustrates the construction of a compression/expansion unit according to the first embodiment.

FIG. 2 is a block diagram which illustrates the construction of the compression/expansion unit 156. This compression/expansion unit 156 comprises an encoder unit 157, a memory unit 158, a decoder unit 159, an operation processing unit 170, a LOG conversion unit 171, and a main scanning counter 182. Of the above, the operation processing unit 170, the LOG conversion unit 171 and the main scanning counter 182 are units required for an image combination processing which will be described later. As an explanation concerning the masking/UCR unit 160 shown in FIG. 1 has already been given, the same unit shown in FIG. 2 is for illustration purposes only, and an explanation thereof is omitted.

Figure 3:
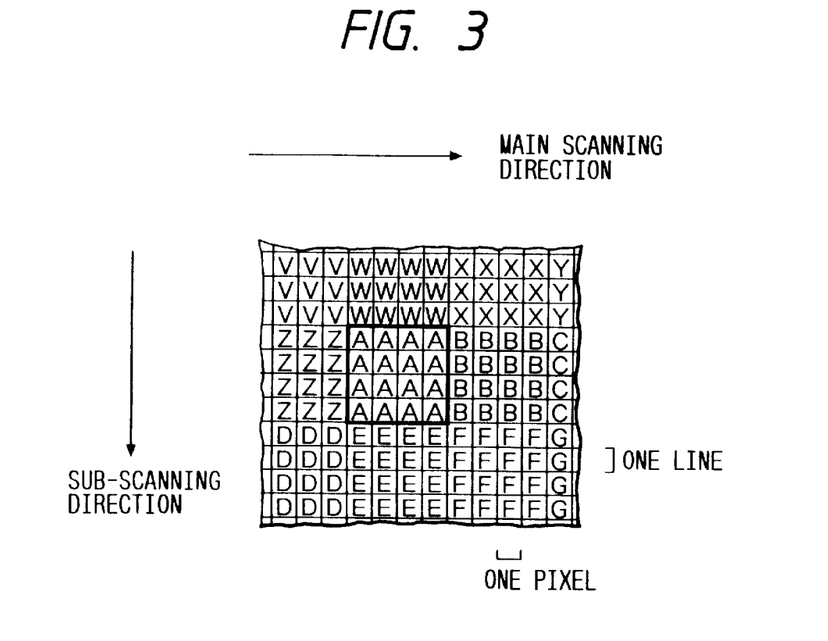
FIG. 3 is a schematic view which illustrates the construction of image data which is processed in the first embodiment.

The basic operation performed by the encoder unit 157, the memory unit 158, and the decoder unit 159 will be explained here. Image data from the variable magnification unit 155 is input to the encoder unit 157 and compressed. When, for example, a portion of the thick frame, shown in FIG. 3, is considered, one frame corresponds to one pixel. This one pixel has three color data of RGB, each data being 8 bits long. Data of 4 pixels×4 lines, i.e., 16 pixels, is made into one block, and L*a*b* converted. Thus, 16 pixels×3 colors×8 bits (=384 bits) is compressed to one twelfth its original size and made to 32 bits. This image data (A) is stored in the memory unit 158. The 32 bits data read out from the memory unit 158 is sent to the decoder unit 159. This data is hereinafter referred to as image data (B). Each of the pixels is expanded by the decoder unit 159 to image data of RGB, each data being 8 bits long. Such an encoder or decoder encodes or decodes respectively based on vector quantization, an ADCT system or the like. The RGB data expanded by the decoder units 159-2 to 159-5 is sent to the LOG conversion unit 171 during a printing operation. The RGB data expanded by decoder unit 159-1 is sent to the operation processing unit 170 during an image combination operation which will be described later.

The RGB data of the four systems sent to the LOG conversion unit 171 during a printing operation are each LOG converted. After this conversion, a total of 24 bits of data are sent to the masking/UCR circuits 160-1 to 160-4 disposed for printing of C, M, Y and K, respectively. The masking/UCR circuits 160-1 to 160-4 generate C, M, Y and K printing signals.

In the embodiment shown in FIG. 2, RGB data decoded by the decoder unit 159-1 is supplied to the operation processing unit 170, and the output from the decoder unit 159-1 is output to a monitor unit 164. As a result, when images are combined, combined image data can be confirmed as an image visible to the naked eye on the monitor unit 164.

Next, the printer unit which performs printing will be explained.

Figure 4:
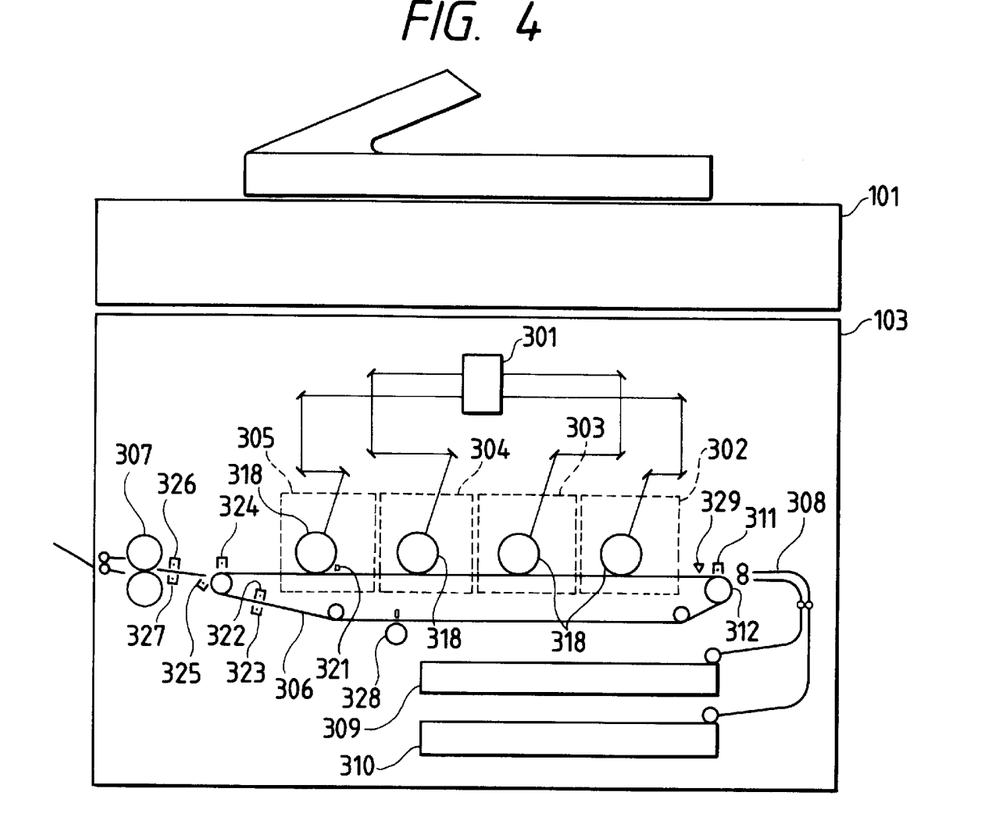
FIG. 4 is a cross-sectional view which illustrates the construction of the mechanism system of the first embodiment.

FIG. 4 is a cross-sectional view which illustrates the construction of the mechanism system of this image recording apparatus. As is shown, the image recording apparatus comprises a manuscript reading apparatus 101 having the aforesaid reader unit and a system for transporting manuscripts, and a printer unit 103 having an image formation unit and a system for transporting sheets of paper.

The printer unit 103 comprises a polygon scanner 301 for scanning a photosensitive drum 318 with a light beam generated by the video processing unit 163, and image formation units 302, 303, 304 and 305 for the colors magenta (M), cyan (C), yellow (Y) and black (K). In this embodiment, the aforesaid decoder units 159-2 to 159-5 read out from the memory unit 158 at a reading timing offset by an amount of time corresponding to the space between the image formation units disposed for each of the colors magenta M, cyan C, yellow Y and black K. As all the image formation units have the same construction, the image formation unit 302 only will be explained here.

Figure 5:
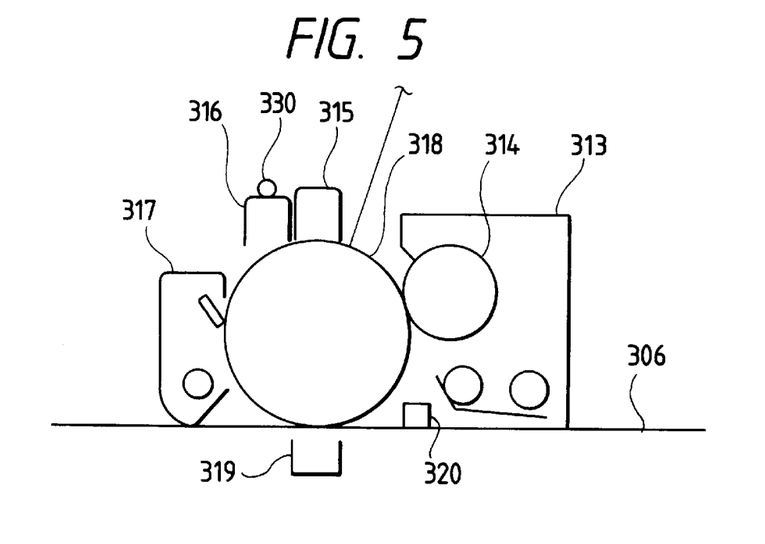
FIG. 5 is a cross-sectional view which illustrates the construction of an image formation unit of the first embodiment.

FIG. 5 is a cross-sectional view which illustrates the construction of the image formation unit 302.

The image formation unit 302 comprises a photosensitive drum 318 for forming a latent image by exposure to a light beam and a development unit 313 for developing toner on the photosensitive drum 318.

The development unit 313 comprises a sleeve 314 for applying a development bias and performing toner development; a primary charger 315 for charging the photosensitive drum 318 to a desired electrical potential; a cleaner 317 for cleaning the surface of the photosensitive drum 318 to which the image is transferred; an auxiliary charger 316 for eliminating charges on the surface of the photosensitive drum 318 cleaned by the cleaner 317 so that satisfactory charging can be produced by the primary charger 315; a preexposure lamp 330 for erasing the charges remaining on the photosensitive drum 318; and a transfer charger 319 for transferring the toner image on the photosensitive drum 318 to a transfer material by discharging charges from the rear surface of a transfer belt 306.

The printer unit 103 further comprises cassettes 309 and 310 for holding transfer materials; a paper supply section 308 for supplying transfer materials from these cassettes 309 and 310; a deposition charger 311 for depositing a transfer material supplied from the paper supply section 308; a transfer belt roller 312, used for rotating the transfer belt 306 and at the same time for depositing and charging a transfer material to the transfer belt 306 in tandem with the deposition charger 311; a discharger/charger 324 for facilitating the separation of transfer materials from the transfer belt 306; a peel charger 325 for preventing an image from being distorted due to peel discharge when the transfer material is separated from the transfer belt 306; prefixing chargers 326 and 327 for augmenting the depositional ability of the toner on the transfer material after the transfer material has been separated so as to prevent the image from being distorted; discharger/chargers 322 and 323 for eliminating the charges on the transfer belt 306 so as to electrostatically initialize the transfer belt 306; and a belt cleaner 328 for removing dirt or dust on the transfer belt 306; a fixer 307 for thermally fixing the toner image on the transfer section on the transfer material, which image has been separated from the transfer belt 306 and has been recharged by the prefixing chargers 326 and 327; and a paper leading-edge sensor 329 for detecting the leading edge of the transfer material supplied onto the transfer belt 306 by means of the paper supply section 308. Detection signals from the paper leading-edge sensor 329 are sent to the reader unit from the printer unit 103, and used as sub-scanning synchronization signals when video signals are sent from the reader unit to the printer unit.

Next, referring back to the reader unit, an operation for combining two images which is performed in the compression/expansion unit 156 will be explained.

In the compression/expansion unit 156, as is shown in FIG. 2, the operation processing unit 170 is disposed in a stage anterior to the encoder unit 157.

The operation processing unit 170 performs matrix computation as follows. If first input image data indicating the first original are denoted as RA, GA and BA, second input image data, inputted next, indicating a second original, are denoted as RB, GB and BB, and the result of the computational operation performed on the two images is denoted as RC, GC and BC:

$$\begin{bmatrix} RC \\ GC \\ BC \end{bmatrix} = \begin{bmatrix} r1 & r2 \\ g1 & g2 \\ b1 & b2 \end{bmatrix} \begin{bmatrix} RA & GA & BA \\ RB & GB & BB \end{bmatrix} \quad (1)$$

The factors r1, r2, g1, g2, b1 and b2 are input from an unillustrated CPU.

The aforesaid image data (A) is read from the reader unit. At this time, the factors in equation (1) are set as given below:

$$\begin{bmatrix} RC \\ GC \\ BC \end{bmatrix} = \begin{bmatrix} 1 & 0 \\ 1 & 0 \\ 1 & 0 \end{bmatrix} \begin{bmatrix} RA & GA & BA \\ RB & GB & BB \end{bmatrix} \quad (2)$$

Figure 6:
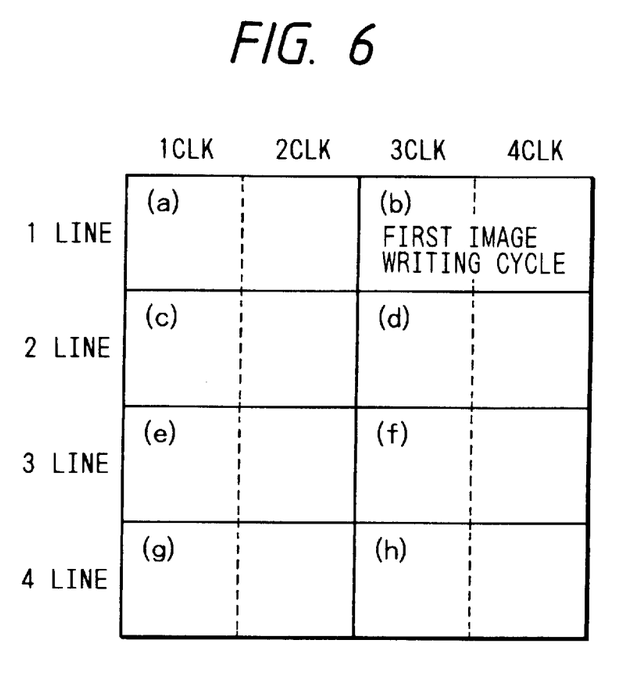
FIG. 6 is a schematic view which illustrates the timing of a time division block when first image data is stored in a memory according to the first embodiment of the present invention.

As a result, the first input image data is made to pass through the encoder unit 157 as it is, and stored in the memory unit 158 at the timing of the time division block shown in FIG. 6(b).

Figure 7:
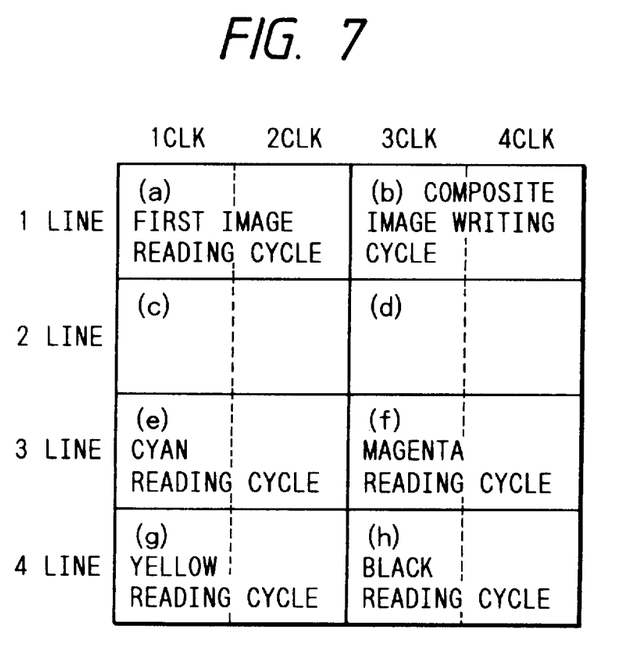
FIG. 7 is a schematic view which illustrates the timing of a time division block when images are combined according to the first embodiment of the present invention.
Figure 8:
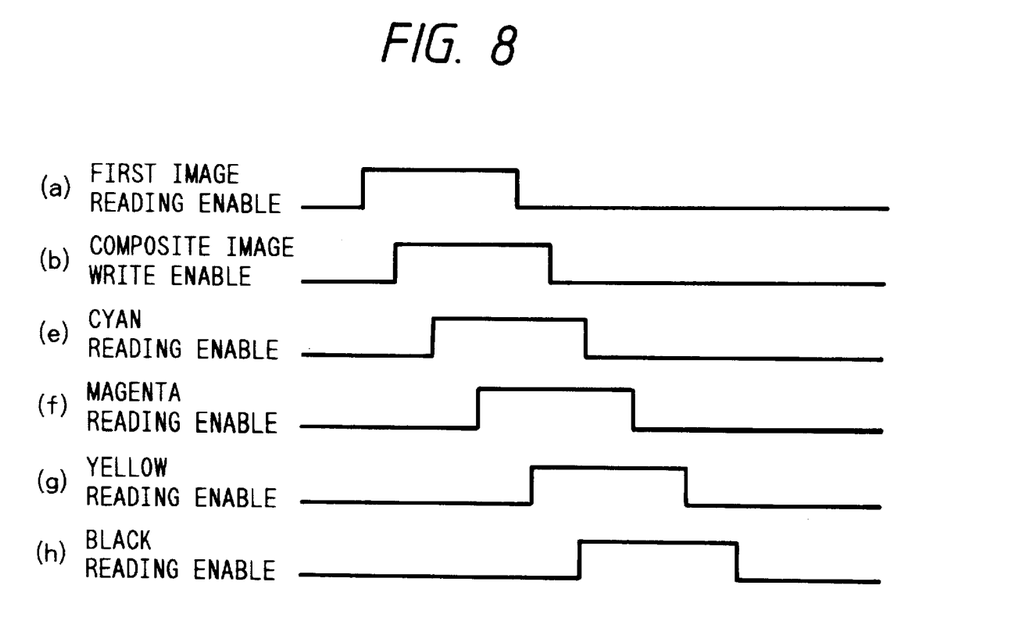
FIG. 8 is a schematic view which illustrates the timing of sub-scanning enable when images are combined according to the first embodiment of the present invention.

Next, during the reading of a second image, the first image is read out from the memory unit 158 at the timing of the time division block shown in FIG. 7(a) and at the timing of the sub-scanning enable shown in FIG. 8(a). To explain in more detail, the image is read from the memory unit 158 a little earlier than the timing at which the second image is read in by an amount of delay of the decoder unit 159-1. The first image which has been read out from the memory unit 158 and made to pass through the decoder unit 159-1, and the second read-in image are input in phase with each other to the operation processing unit 170.

As regards such operations, a memory driving circuit 144 controls an operation for reading out from or writing to the memory 158. The memory driving circuit 144 performs different reading-out/writing operations from or to the memory 158 when images are or are not combined. That is, when images are combined, image data is read out as shown in FIGS. 8(a) to 8(h). When images are not combined, image data is read out at only the timings shown in FIGS. 8(e) to 8(h). At this time, in the operation processing unit 170, the equation (1) described above is set as given below:

$$\begin{bmatrix} RC \\ GC \\ BC \end{bmatrix} = \begin{bmatrix} 1/2 & 1/2 \\ 1/2 & 1/2 \\ 1/2 & 1/2 \end{bmatrix} \begin{bmatrix} RA & GA & BA \\ RB & GB & BB \end{bmatrix} \quad (3)$$

The image on which a computation operation has been performed is made to pass through the encoder unit 157 again and stored in the memory unit 158 at the timing of the time division block shown in FIG. 7(a) and at the timing of the sub-scanning enable shown in FIG. 8(b). Next, an image of CMYK is read out at each timing of the time division block shown in FIGS. 7(e) to 7(h) and at each timing of the sub-scanning enable shown in FIGS. 8(e) to 8(h) and sent to the masking/UCR unit 160 after passing through the decoder units 159-2 to 159-5 and the LOG conversion unit 171. Thereafter, the image is output in the above-described way.

Next, an explanation will be given about an operation for combining images by changing weighting factors as the scanning process moves in the direction of the main scanning by using the main scanning counter 182.

When, for example, the weights of the output image data RC are changed linearly in the direction of the main scanning from the weighting of RA=0% and RB=100% to RA=100% and RB=0%, $$RC = Xad \cdot RA / Xn + (Xn - Xad) \cdot RB / Xn$$
$$= Xad(RA / Xn - RB / Xn) + RB,$$

where Xad is the value of the main scanning counter 182, which value is 0, 1, 2, ..., Xn.

The main scanning counter 182 counts CLK's from the CCD driving circuit 150 and resets the count numerical values in response to HSYNC. The main scanning counter 182 indicates the position of an image signal read out from a CCD in the direction of the main scanning.

The following general equation is obtained from the above:

$$RC = Xad \cdot [r1 \ r2] \begin{bmatrix} RA \\ RB \end{bmatrix} + [r5 \ r6] \begin{bmatrix} RA \\ RB \end{bmatrix} \quad (4)$$

Figure 9:
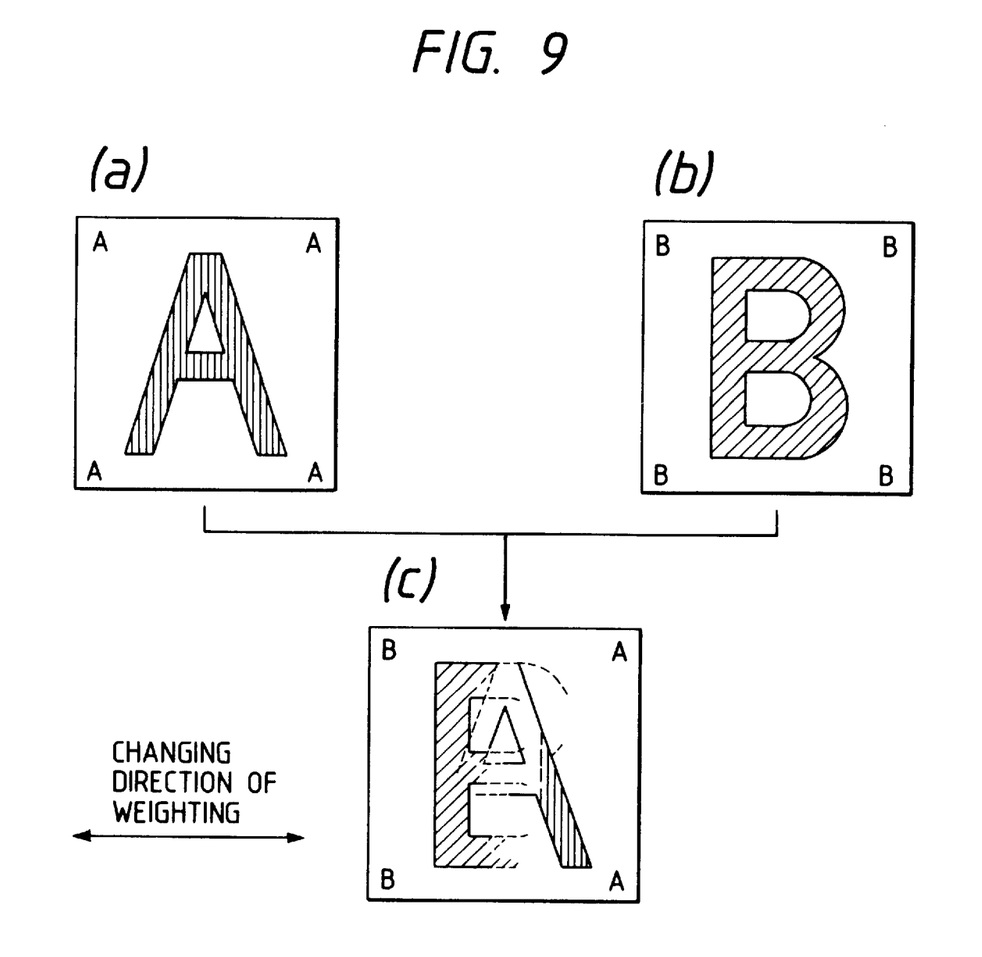
FIG. 9 is a schematic view which illustrates concrete examples of images to be processed according to the first embodiment and a combined image after this processing.

As a result, when the operation processing unit 170 makes a computation, a combined image can be obtained in which the weighting factors are changed as the scanning process moves in the direction of the main scanning. When, for example, images shown in FIGS. 9(a) and 9(b) are combined, the combined image shown in FIG. 9(c) can be obtained.

Figure 10:
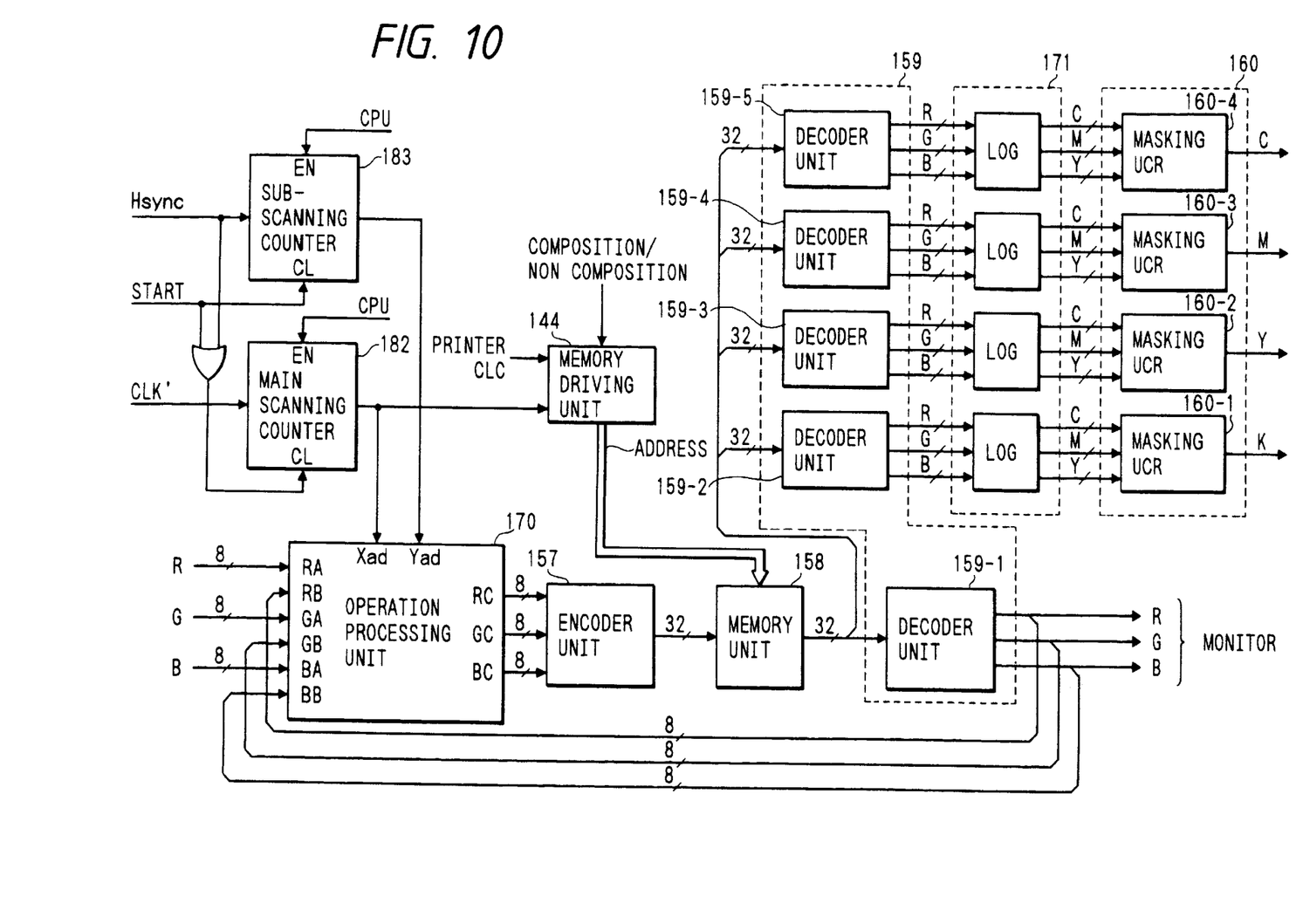
FIG. 10 is a block diagram which illustrates the construction of a compression/expansion unit according to a second embodiment of the present invention.

FIG. 10 is a block diagram which illustrates the construction of the compression/expansion unit 156 according to the second embodiment of the present invention.

Since a sub-scanning counter 183 is disposed in this embodiment, in addition to the components of the first embodiment (FIG. 2), images can be combined by changing weighting factors in the sub-scanning and main-scanning directions. Such a sub-scanning counter counts the above-mentioned HSYNC and is reset by a start signal indicating when the counter begins reading the manuscript, which signal is output from an unillustrated CPU.

In this embodiment, a computation equation which is computed in the operation processing unit 170 is as follows:

$$RC = [Xad \ Yad] \begin{bmatrix} r1 & r2 \\ r3 & r4 \end{bmatrix} \begin{bmatrix} RA \\ RB \end{bmatrix} + [r5 \ r6] \begin{bmatrix} RA \\ RB \end{bmatrix} \quad (5)$$

where Xad and Yad are values of the main scanning counter 182 and the sub-scanning counter 183, respectively; Xad=0, 1, 2, ..., Xn, and Yad=0, 1, 2, ..., ym.

Figure 11:
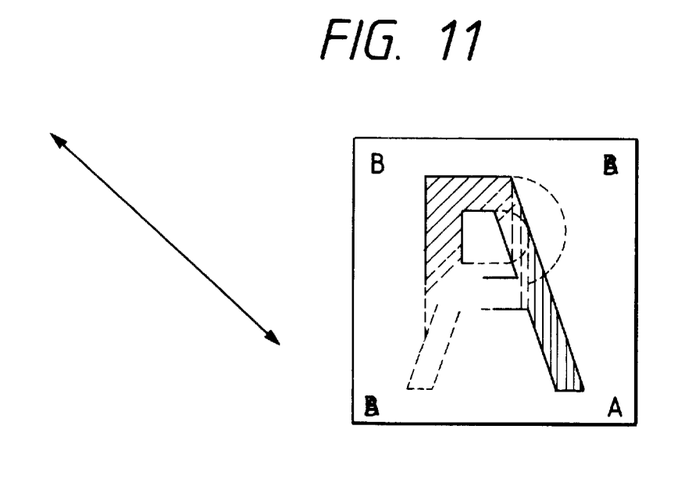
FIG. 11 is a schematic view which illustrates a concrete example of a combined image processed in the second embodiment.
Figure 12:
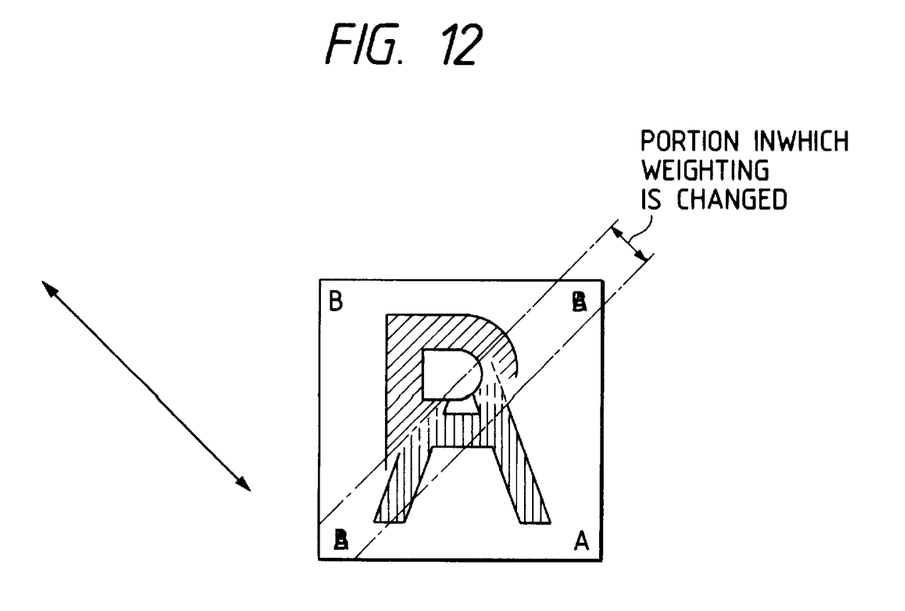
FIG. 12 is a schematic view which illustrates a concrete example of a combined image processed in a third embodiment of the present invention.

When, for example, the equation given below is set as follows:

$$RC = [Xad \ \ Yad] \begin{bmatrix} 1/2Xn & -1/2Xn \\ 1/2Ym & -1/2Ym \end{bmatrix} \begin{bmatrix} RA \\ RB \end{bmatrix} + [0 \ \ 1] \begin{bmatrix} RA \\ RB \end{bmatrix} \quad (6)$$

as shown in FIG. 11, an image which is changed linearly from the weighting of RA=0% and RB=100% to RA=100% and RB=0% along a line at an angle of 45° from the upper left to the lower right, i.e., along a line which satisfies the relation Xn–Ym. The angle of weighting can be changed by properly setting factors r1 to r6. A combination of images can be made at will as shown in FIGS. 9 and 12 by operating the operation section in such a way that the tables for the counting operation by the sub-scanning counter 183 and the main scanning counter 182 are set by the CPU 165 independently of each other in accordance with the operation of the operation unit 166.

Next, according to the third embodiment, by rearranging the equation (5) of the second embodiment, we obtain:

$$RC = [\alpha \ \ \beta] \begin{bmatrix} RA \\ RB \end{bmatrix} \quad (7)$$

where α=r1Xad+r3Yad+r5, and β=r2Xad+r4Yad+r6.

Equation (7) is classified into the following examples (1) to (3) depending upon the value of α

(1) When $\alpha < r7$ $RC = RB$.

(2) When $r7 \leq \alpha < r8$ $RC = \{r1'(Xad - X0) + r3'(Yad - Y0) + r5'\}$ $RA\{r2'(Xad - X0) + r4'(Yad - Y0) + r6'\}RB$.

(3) When $r8 \leq \alpha$, $RC = RA$.

In the above equation, r1' to r6' are factors in which the ratio of an increase in the counter is taken into consideration in view of the fact that portions where weights are changed become narrow, and X0 and Y0 are the initial values of counters in portions where weights are changed. As a result, as shown in FIG. 12, the weighting factors can be partially changed.

Figures 13, 13A:
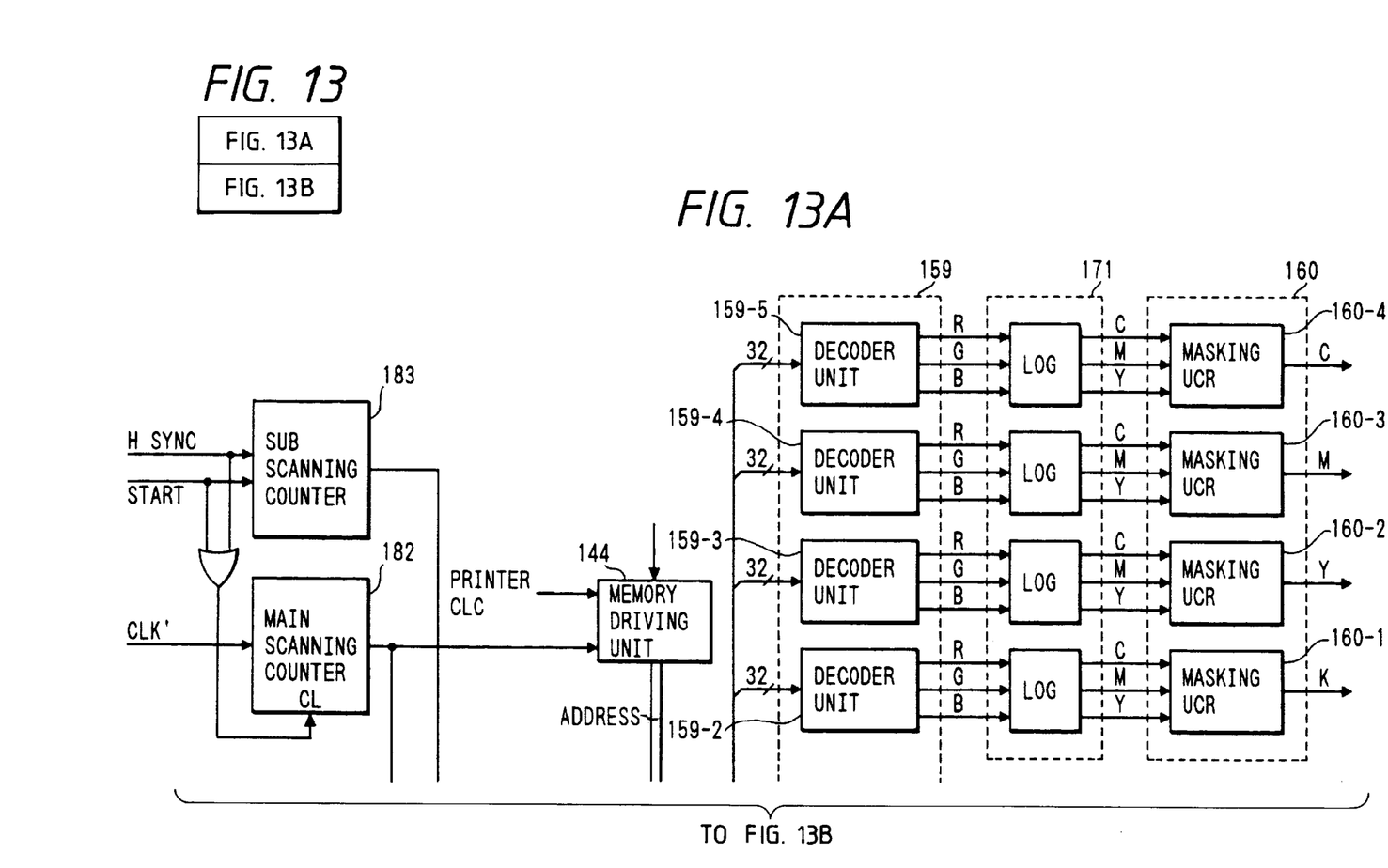
FIG. 13 is a block diagram illustrating the construction of the compression/expansion unit according to the second embodiment of the present invention.
Figure 13B:
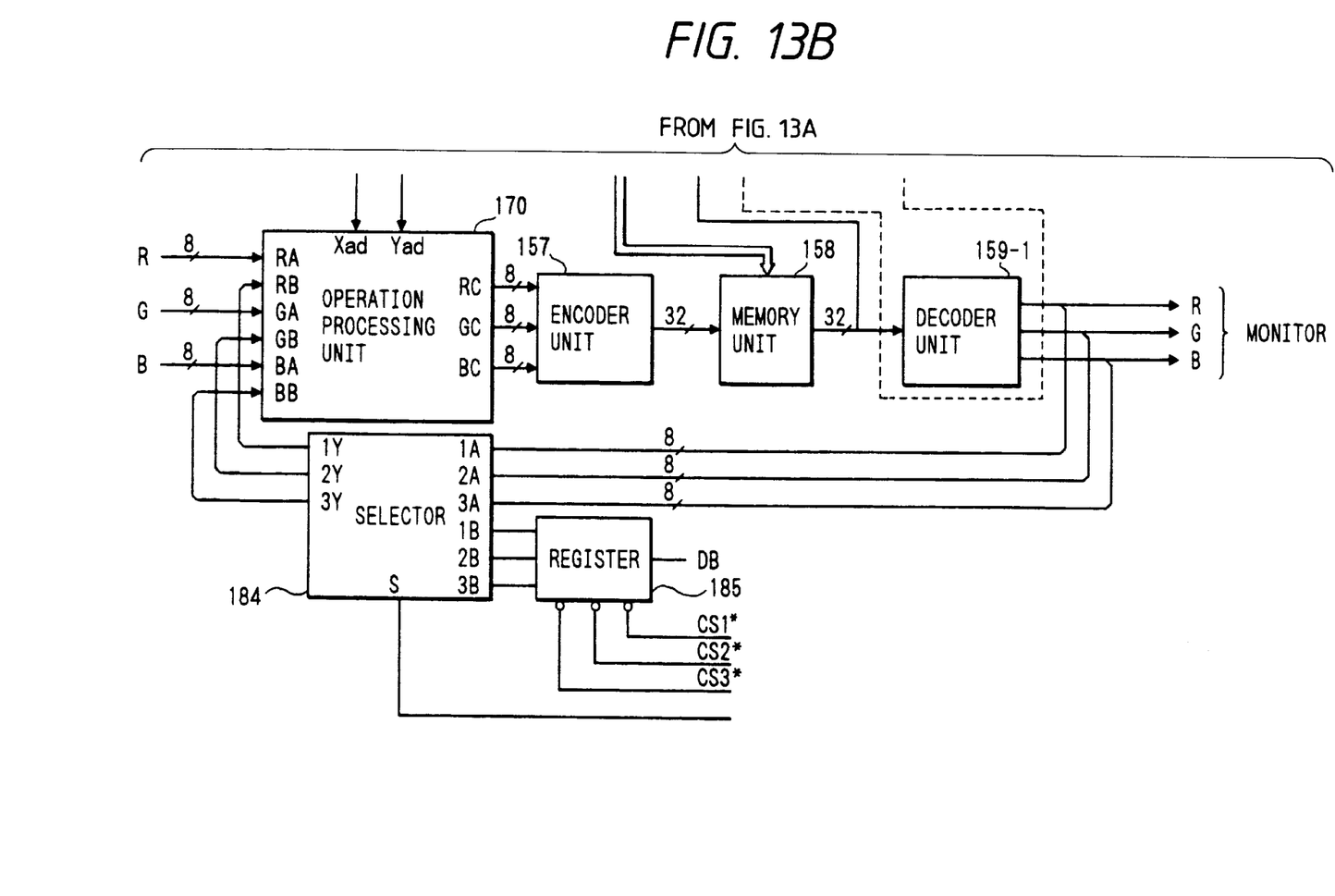

FIG. 13 is a block diagram illustrating the construction of the compression/expansion unit 156 according to the fourth embodiment of the present invention.

This embodiment is constructed so that, in addition to the capabilities of the second embodiment (FIG. 10), input RB, GB, BB to the operation processing unit 170 can be obtained from the aforesaid CPU as well as from the output of the decoder unit 159. In this embodiment, in particular, images of uniform colors using fixed values are combined for the second image. For example, an image as a whole which is reddish may be obtained. Fixed values are preset in a register 185 by the CPU via a data bus DB. These values are input to the operation processing unit 170 in synchronization with the input of the second image during an image combination operation by selecting the values by a selector 184. Chip select signals CS1*, CS2* and CS3* are used to store data from the data bus DB in each of the data storage areas corresponding to R, G and B in the register 185.

Figure 14:
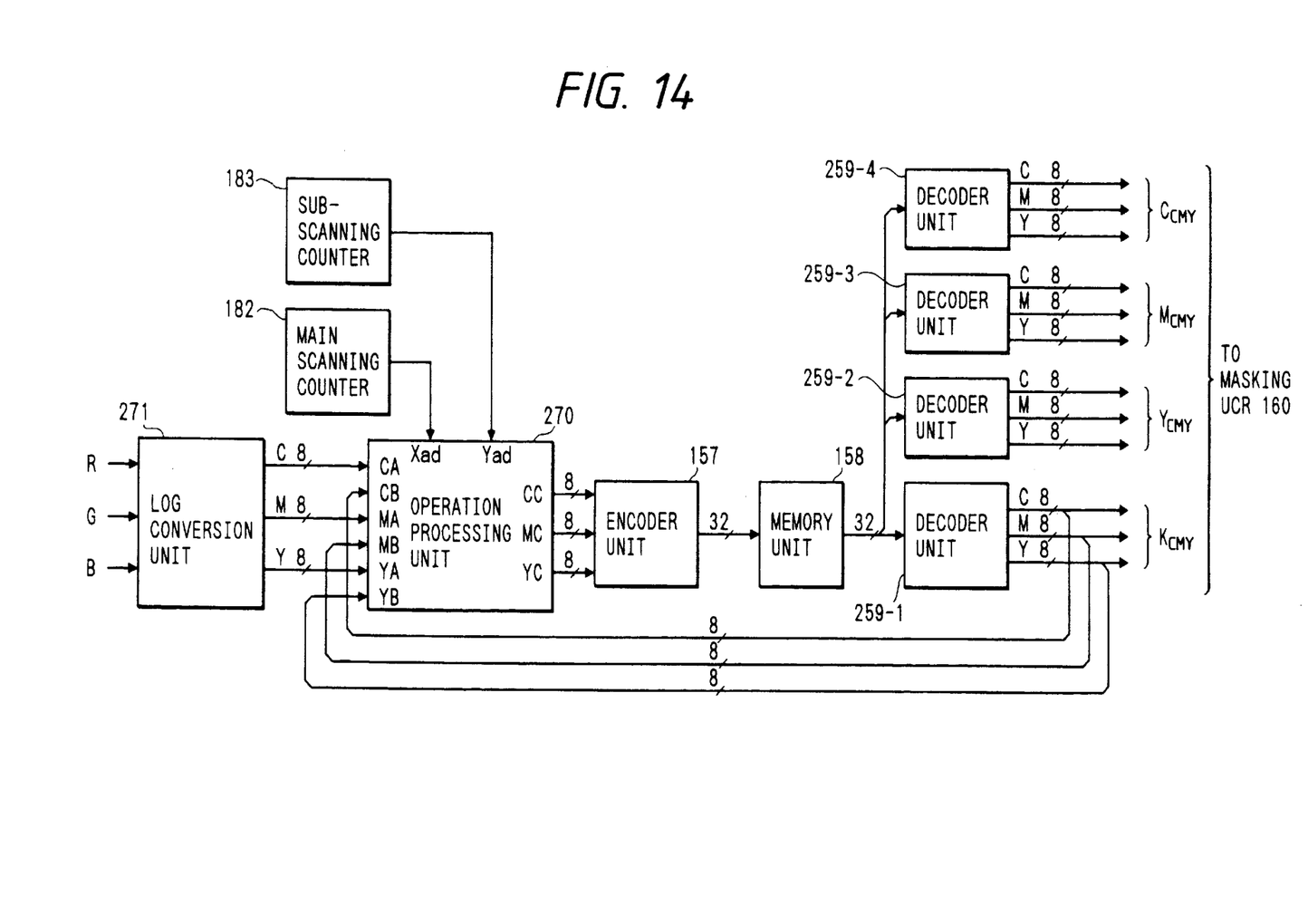
FIG. 14 is a block diagram which illustrates the construction of a fourth embodiment of the present invention.

FIG. 14 shows a modification of the present invention.

In this modification, a LOG conversion unit 271 is disposed anterior to an operation processing unit 270, and images are combined using image data converted form RGB to CMY. As a result of combining images using CMY data in this manner, the circuit construction is made simpler, because there is no need to have four LOG conversion units 271 for four systems of Y, M, C and K.

The construction of the operation processing unit 270 is the same as in the above-described embodiments except that computations are performed using CMY data. In this modification, decoder units 259-1 to 259-4 for reproducing C, M, Y and K are provided. CMY data from the decoder unit 259-1 for K is fed back to the operation processing unit 270. Since the decoder unit 259-1 is used in common in this manner, the construction of the circuit thereof can be made simpler.

The present invention is not limited to the above-described embodiments. For example, it can combine image data filed in a memory beforehand in addition to images which are read. Although a case in which two image data are sequentially input and the first image data is fed back, has been explained, the present invention can be applied to an apparatus for inputting two image data in parallel at the same time and combining them.

According to the present invention, as described above, two images can be combined by changing the weighting factors in one combined image, and thus a wide variety of desired image editing operations can be easily performed.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims.

What is claimed is:

1. An image processing apparatus, comprising:

reading means for reading first and second image signals corresponding to a first original and a second original;

correcting means for correcting color characteristics of the first and second image signals;

compressing means for compressing the corrected first image signal;

memory means for storing the corrected first image signal compressed by said compressing means;

expanding means for reading the compressed corrected first image signal stored in said memory means and expanding the compressed corrected first image signal read from said memory means in accordance with a reading operation of the corrected second image signal by said reading means; and combining means for combining the expanded corrected first image signal and the corrected second image signal in ratios determined according to weighting factors.

2. An image processing apparatus according to claim 1, wherein said supplying means comprises means for converting an object image into image signals.

3. An image processing apparatus according to claim 1, further comprising:

forming means for forming a visible image based on an image signal combined by said combining means.

4. An image processing apparatus according to claim 3, wherein said forming means is an electrophotographic printer.

5. An image processing apparatus according to claim 1, wherein said combining means combines said first image signal and said second image signal in ratios determined according to weighting factors which are continuously changed in accordance with positions of said predetermined picture.

6. An image processing apparatus according to claim 1, wherein said compressing means compresses the first image signal by a vector quantization or an ADCT method.

7. An image processing apparatus according to claim 1, further comprising displaying means, wherein said displaying means displays the expanded first image data.

8. An image processing apparatus according to claim 1, wherein said expanding means reads the first image signal prior to the supplying operation of the second image signal.

9. An image processing apparatus according to claim 1, wherein one of the first image signal and second image signal is monochrome.

10. An image processing apparatus according to claim 1, further comprising:
compressing means for compressing the first image signal, and wherein after the first image signal is compressed by said compressing means, said storing means stores the compressed first image signal.

11. An image processing apparatus according to claim 10, further comprising expanding means for expanding the compressed first image signal stored in said storing means.

12. An image processing apparatus according to claim 11, further comprising displaying means, wherein said displaying means displays the expanded first image data.

13. An image processing apparatus according to claim 10, wherein said compressing means compresses the first image signal by a vector quantization or an ADCT method.

14. An image processing apparatus according to claim 10, wherein said expanding means reads the first image signal prior to the supplying operation of the second image signal.

15. An image processing apparatus, comprising:
combining means for combining first image data and second image data to output combined data; and
counter means for counting a synchronizing signal in synchronization with at least one of the first and second image data in both a main scanning direction and a subscanning direction,
wherein said combining means combines the first image data and the second image data according to a weighting factor which changes according to a count value of said counter means, and wherein said first image data and second image data are data read by a common reading means and color corrected by a common correcting means.

16. An image processing apparatus according to claim 15, further comprising:
a memory for storing either one of said first or second image data.

17. An image processing apparatus according to claim 16, wherein said memory stores one picture of said first image data.

18. A method of image processing comprising the steps of:
reading first and second image signals corresponding to a first originals and a second original;
correcting means for correcting color characteristics of the first and second image signals;
compressing the corrected first image signal;
storing the compressed corrected first image signal compressed in said compressing step;
reading the stored compressed corrected first image signal and expanding the stored corrected first image signal in accordance with a reading operation of the corrected second image signal; and
combining the expanded corrected first image signal and said corrected second image signal in ratios determined according to weighting factors.

19. A method for image processing according to claim 18, wherein said first supplying step includes the step of converting an object image into image signals.

20. A method for image processing according to claim 18, further comprising the step of:
forming a visible image based on an image signal combined by said combining step.

21. A method for image processing according to claim 20, wherein said forming step includes electrophotographic printing.

22. A method for image processing according to claim 18, wherein said combining step includes combining said first image signals and said second image signals in a ratio determined according to the weighting factors which are continuously changing in accordance with a position of said predetermined picture.

23. A method of image processing comprising the steps of:
combining first image data and second image data to output combined data; and
counting a synchronizing signal in synchronization with at least one of the first and second image data in both a main scanning direction and a subscanning direction, wherein the combining of the first image data and the second image data is performed according to a weighting factor which changes according to a count value in said counting step, and wherein the first image data and second image data are data read by a common reading means and color corrected by a common correcting means.

24. A method for image processing according to claim 23, further comprising the step of:
storing either one of said first or second image data.

25. A method for image processing according to claim 24, wherein said storing step stores one picture of said first image data.

* * * * *

UNITED STATES PATENT AND TRADEMARK OFFICE
CERTIFICATE OF CORRECTION

PATENT NO. : 5,946,423
DATED : August 31, 1999
INVENTOR(S) : Hiroyuki Takahashi et al.

Page 1 of 1

It is certified that error appears in the above-identified patent and that said Letters Patent is hereby corrected as shown below:

Title page, [30],
Foreign Application Priority Data, "April 19, 1991" should read -- April 8, 1991 --.

Title page, [56] References Cited,
U.S. Patent Documents, "perdox" should be deleted, "Haug" should read -- Hara --, and "Tessia" should read -- Tessier --.

Column 7,
Line 34, RA{r2' (Xad-X0)" should read -- RA+{r2' (Xad-X0)" --.

Column 10,
Line 4, "originals" should read -- original --.

Signed and Sealed this

Seventh Day of August, 2001

*Attest:*

NICHOLAS P. GODICI
*Attesting Officer*    *Acting Director of the United States Patent and Trademark Office*